United States Patent
Mund

[11] Patent Number: 5,074,476
[45] Date of Patent: Dec. 24, 1991

[54] METHOD OF MANUFACTURING FIBRE MATERIAL CONTAINING LIGNOCELLULOSE FOR THE PRODUCTION OF FIBRE BOARDS

[75] Inventor: Rolf Mund, Springe, Fed. Rep. of Germany

[73] Assignees: Bison-Werke Baehre; Greten GmbH & Co. KG, Springe, Fed. Rep. of Germany

[21] Appl. No.: 475,601

[22] Filed: Feb. 6, 1990

[30] Foreign Application Priority Data

Feb. 7, 1989 [DE] Fed. Rep. of Germany ....... 3903591

[51] Int. Cl.$^5$ ............................................. B02C 21/00
[52] U.S. Cl. ...................................... 241/17; 241/18; 241/23; 241/28; 241/41; 241/261.3; 162/20; 162/28
[58] Field of Search .............. 241/17, 18, 23, 28, 241/41, 65, 261.2, 261.3; 162/20, 26, 28, 47, 56, 189, 261

[56] References Cited

U.S. PATENT DOCUMENTS

| | | | |
|---|---|---|---|
| 3,627,629 | 12/1971 | Miller | 241/65 X |
| 4,082,233 | 4/1978 | Reinhall | 162/28 X |
| 4,136,831 | 1/1979 | Cederquist et al. | 241/28 X |
| 4,283,252 | 11/1981 | Reinhall | 241/18 |
| 4,555,254 | 11/1985 | Fisher | 162/28 X |

FOREIGN PATENT DOCUMENTS

| | | |
|---|---|---|
| 1089540 | 9/1960 | Fed. Rep. of Germany . |
| 2442627 | 3/1975 | Fed. Rep. of Germany ...... 241/244 |
| 2458929 | 6/1978 | Fed. Rep. of Germany . |
| 8302788 | 8/1983 | World Int. Prop. O. ............ 241/23 |

Primary Examiner—Mark Rosenbaum
Assistant Examiner—Frances Chin
Attorney, Agent, or Firm—Townsend and Townsend

[57] ABSTRACT

A method and an apparatus is described for the manufacture of fibrous material containing ligno cellulose for the production of fibre boards by the dry process, wherein cleaned and mechanically dewatered starting material such as hacked chips, hacked shavings or the like pass into a preheating stage and are subsequently broken down into fibre material. In order to use the water which arises on mechanical dewatering of the cleaned starting material which contains lignocellulose in a manner which is particularly friendly to the environment and also particularly economical, provision is made for the water which arises on dewatering a starting material which is cleaned by a mechanical process to be fed completely to a preheating stage.

14 Claims, 1 Drawing Sheet

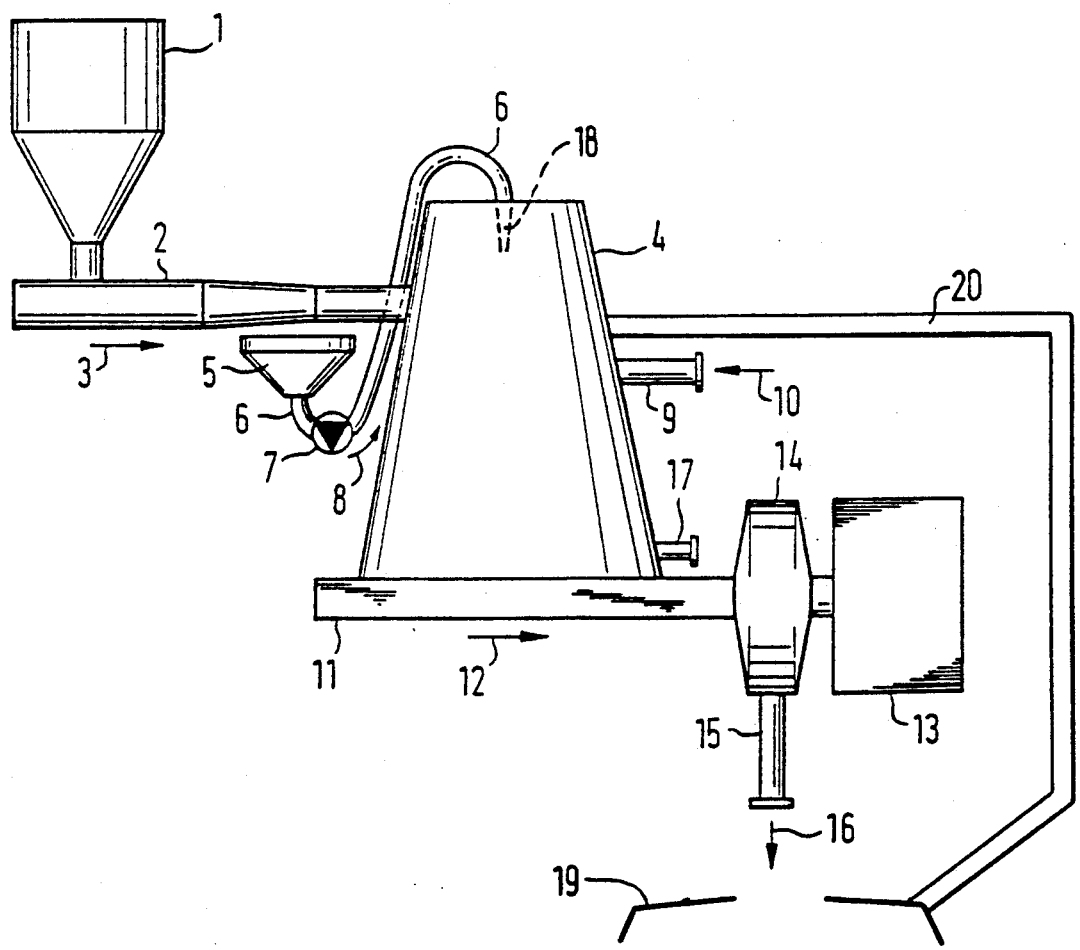

METHOD OF MANUFACTURING FIBRE MATERIAL CONTAINING LIGNOCELLULOSE FOR THE PRODUCTION OF FIBRE BOARDS

FIELD OF THE INVENTION

The invention relates to a method of manufacturing fibre material containing lignocellulose for the production of fibre boards in accordance with the dry process, in which clean and mechanically dewatered starting material such as hacked chips and hacked shavings or the like enter into a preheating stage and are subsequently broken down to fibre material.

Furthermore, the invention is directed to an apparatus for carrying out this method.

BACKGROUND OF THE INVENTION

A method of manufacturing fibre boards is known from DE PS 24 58 929 in which the water which occurs during the mechanical dewatering of the hacked shavings is used for the washing of the turnings, for the shaft seal of the fibre forming device and as a spray water during the formation of the fibre boards from a material slurry (wet process), wherein a wet sheet is guided into a press and is dewatered mechanically to 50% dry content and is then subsequently dried with the application of heat and pressure to a finished end product and the returned water which is thereby pressed out is collected in a box and passes from there into a tank from which it is conveyed through a duct by means of a pump.

One of the important disadvantages of this known process consists, in comparison to a known dry process (DE-A-1 089 540) in the high water consumption which gives rise to a correspondingly high consumption of energy during the pressing process and thus increases the costs of the process. Moreover, following dewatering, waste water pollution cannot be avoided and, as is known, represents a serious problem.

OBJECT OF THE INVENTION

The present invention is based on the object of providing a method of the initially named kind which makes it possible to use the water, which arises during mechanical dewatering of the cleaned starting material containing lignocellulose in a manner which is particularly friendly to the environment and also particularly economical.

SUMMARY OF THE INVENTION

The apparatus for carrying out the method of the invention should have a simple construction, be compact and require only a small investment.

In accordance with the invention this object is satisfied in that the water which occurs during dewatering of the cleaned starting material by a dry process is returned at least in part to a preheating stage which stands under pressure.

As a result of the method teaching of the invention one not only avoids the previously necessary later disposal problem resulting from the remaining contamination of the waste water, but also obtains a high degree of economy since, on the one hand, a washing of the starting material containing lignocellulose is avoided, and on the other hand, the total quantity of water which arises during dewatering of this material is always used in the preheating stage which directly follows the dewatering.

In a further development of the method of the invention there exists the advantageous possibility of supplying to the preheating stage the entire quantity of water which arises on dewatering the starting material containing lignocellulose. The supply of the total quantity of water to the preheating stage can take place separately or simultaneously together with the supply of fresh steam depending on the particular circumstances which prevail in practice. The separate supply of the total quantity of water into the preheating stage can be preferred.

Further advantageous possibilities of realizing the process of the invention and advantageous developments of the apparatus of the invention are set forth in the following description.

BRIEF DESCRIPTION OF THE PREFERRED EMBODIMENT

The figure shows an apparatus of manufacturing fiber material containing lignocellulose.

An apparatus for carrying out the method of the invention will now be explained in more detail by way of an example with reference to the drawing which comprises a single figure.

In the illustrated apparatus mechanically cleaned "hacked" wooden chips are supplied in a suitable manner into a dispensing station 1 and are fed continuously from the latter by means of a screw conveyor 2 in the direction of the arrow 3 into a preheater 4.

The screw conveyor 2 presses the mass of hacked chips together to a plug so that, on the one hand, the required seal is achieved relative to the steam pressure which prevails in the preheater 4 and, on the other hand, water is pressed out of the mass of hacked chips.

The water which arises during the outpressing dewatering action passes into a collection funnel 5 and is pumped from there through a duct or conduit 6 by means of a pump 7 in the direction of the arrow 8 into the preheater 4. Pumps whose function is not impaired by any eventual small wooden particles contained in the outpressed water are preferably used for the pump 7. The pump is however always a high pressure pump which is able to fulfill its conveying function relative to the steam pressure which prevails in the preheater 4, i.e. the pump 7 imparts to the water a pressure at least substantially the same as the pressure which prevails in the preheater 4.

Live steam is supplied by a duct 9 to the preheater 4 in the direction of the arrow 10. This duct 9 can, in accordance with a variant of the embodiment, also open into the region of the duct 6 which supplies the outpressed water, i.e. it can open into the uppermost region of the preheater 4. It is also possible to optionally supply additional live steam as a supplement in the base region of the preheater 4 via an additional duct 17.

The outpressed water can be directly injected through a nozzle 18, or alternatively, this water can be first mixed with the live steam and then supplied to the preheater, for example by providing a mixing region in the latter. The ducts 6 and 9 conveying the water and the live steam respectively open either in substantially the same direction or at predetermined angles into the preheater 4.

In the preheater 4 the wooden hacked chips are heated with water vapour to a desired temperature of for example up to 165 degrees C and are subjected to a higher pressure of up to approximately 7 bars corresponding to the temperature.

After preheating has taken place the hacked chips pass into the region of influence of a conveying device 11 which transports them in the direction of the arrow 12 to a fibre forming device 14 which is driven by a motor 13. The splitting up of the prewarmed wooden hacked chips into fibrous material then takes place under the prevailing pressure and temperature conditions and the fibrous material is then blown out through a duct 15 in the direction of the arrow 16 and is subsequently subjected to further treatment stages.

The steam which is separated off from the broken down fibre material can be returned again into the preheater, for example by means of a collecting hood 19 and a return duct 20, or can also be discharged into the atmosphere either directly or after having passed through a cleaning stage, not shown.

I claim:

1. A method of manufacturing fibre material containing lignocellulose for use in producing fibre boards in accordance with a dry process, comprising the steps of first dewatering a clean starting material thereafter preheating the starting material in a preheating stage, subsequently breaking the material down into a fibre material, adding to water which occurs during the dewatering of the starting material live steam under pressure, and at least partially returning the water with the added live steam to the preheating stage.

2. A method in accordance with claim 1, characterized in that the quantity of water which occurs through dewatering of the starting material is totally passed at the same time together with live steam to the preheating stage.

3. A method in accordance with claim 2, characterized in that the quantity of water which occurs during dewatering is mixed with the live steam and then supplied to the preheating stage.

4. A method in accordance with one of the claim 1, characterized in that the quantity of water which occurs during dewatering is lead to the preheating stage at a pressure which is at least substantially the same as the pressure which prevails in the preheating stage.

5. A method in accordance with claim 1, characterized in that the quantity of water which occurs during dewatering is injected through a nozzle on being introduced into the preheating stage.

6. Apparatus for manufacturing fibrous material containing lignocellulose for the production of fibre boards in accordance with a dry process, in which clean and mechanically dewatered starting material enters a preheating stage and is subsequently broken down in a fibre material, the apparatus comprising a dispensing station for the starting material, a screw conveyor, a collecting funnel and a duct for water which occurs during dewatering, a preheater with a duct for supplying live steam, a conveyor device arranged in a floor region of the preheater, a device driven by a motor for forming fibres and a duct for blowing out the fibrous material, characterized in that the duct (6) for the water which occurs during dewatering is provided with a pump (7) and opens into the preheater (4).

7. Apparatus in accordance with claim 6, characterized in that the duct (6) for water opens into an upper region of the preheater (4).

8. Apparatus in accordance with claims 6, characterized in that a mixing region for live steam and water is provided in the preheater (4).

9. Apparatus in accordance with claims 6, characterized in that the ducts (6, 9) carrying water and live steam respectively open in substantially a same direction into the preheater (4).

10. Apparatus in accordance with claims 6, characterized in that the ducts (6 and 9) which carry water and live steam respectively open at predeterminable angles into the preheater (4).

11. Apparatus in accordance with claim 6, characterized in that an additional live steam duct (17) is provided which opens into the floor region of the preheater (4).

12. Apparatus in accordance with claim 6, characterized in that steam is separated off from the broken down fibre material and returned into the preheater (4).

13. Apparatus in accordance with claim 6, characterized in that the fibre material saturated with steam is dried after leaving the fibre forming device (14), with remaining steam emerging into free atmosphere.

14. Apparatus in accordance with claim 13, characterized in that the steam is led through a cleaning stage prior to escaping into free atmosphere.

* * * * *